H. M. HOBART.
ELECTRIC SHIP PROPULSION.
APPLICATION FILED SEPT. 21, 1916.
1,304,181.
Patented May 20, 1919.
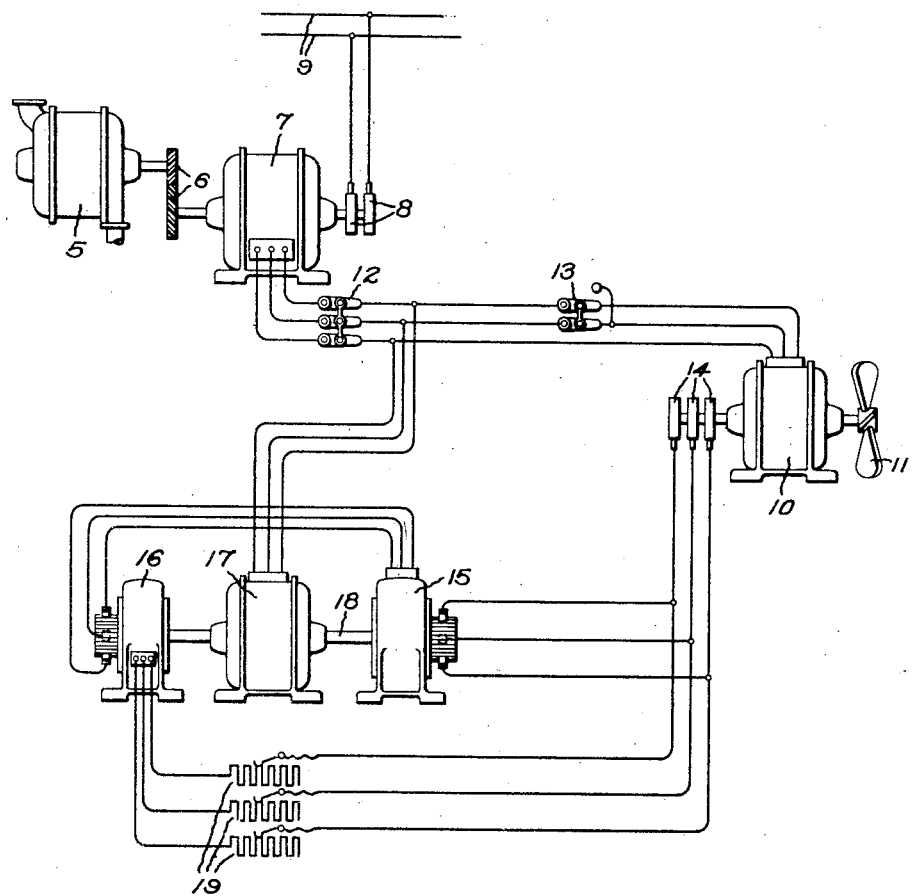
Inventor:
Henry M. Hobart
by Alberto Davis
His Attorney.

UNITED STATES PATENT OFFICE.

HENRY M. HOBART, OF SCHENECTADY, NEW YORK, ASSIGNOR TO GENERAL ELECTRIC COMPANY, A CORPORATION OF NEW YORK.

ELECTRIC SHIP PROPULSION.

1,304,181.  Specification of Letters Patent.  Patented May 20, 1919.

Application filed September 21, 1916. Serial No. 121,505.

*To all whom it may concern:*

Be it known that I, HENRY M. HOBART, a citizen of the United States, residing at Schenectady, county of Schenectady, State of New York, have invented certain new and useful Improvements in Electric Ship Propulsion, of which the following is a specification.

My invention relates to electric ship propulsion, and particularly to systems of ship propulsion in which the propellers are driven by polyphase induction motors. The invention has for its object the provision of an improved electric system of ship propulsion. A more particular object of the invention is the provision of an improved combination and arrangement of electrical apparatus for ship propulsion of low first cost and in which the steam consumption at all speeds of the ship is low, and in which is provided a ready and efficient control of the speed.

Considerable study and attention have already been given to electric systems of ship propulsion in which the propellers are driven by polyphase induction motors receiving electric energy from polyphase turbo-alternators. An elastic fluid turbine can be best designed for high efficiency as a high speed machine. On the other hand, a ship's propeller must be driven at a relatively low speed for efficient operation. Suitable speed reducing means must, accordingly, be provided between the turbine and the propellers, and in electric systems of ship propulsion, this speed reducing means consists of an electric generator coupled to the turbine and delivering electric energy to suitable motors operatively connected to the propellers. At the present time, it is generally considered preferable to employ alternating current generators and polyphase induction motors. In all prior systems with which I am acquainted, the frequency of the alternating current generators has been relatively high, and, accordingly, the design of the propeller-driving induction motors for the low speeds required for efficient propeller action is greatly handicapped. For this reason it has heretofore been suggested to connect the induction motors to the propellers through mechanical speed reducing gearing. The cost of a mechanical speed reducing gearing depends upon the speed of its lowest speed member, and becomes more expensive the lower the speed of this member. I have discovered that it is important in combining electric drive with mechanical gearing that the first speed reduction be accomplished by the mechanical gearing. The speed of the lowest speed gear member is even then relatively high, and the remaining necessary reduction in speed can be very satisfactorily accomplished by electrical machinery.

In carrying out my present invention, I connect a polyphase alternating current generator to a high speed elastic fluid turbine through suitable mechanical speed reducing gearing. Alternating current of relatively low frequency can thereby be produced, and the propeller-driving induction motor or motors can be more satisfactorily designed for such low frequency than for the relatively high frequencies heretofore employed. Furthermore, a speed controlling apparatus including a polyphase commutator motor can be very advantageously employed to control the speed of a propeller-driving induction motor where such a motor is operated with alternating current of relatively low frequency. Accordingly, in my present system, I propose to provide the propeller-driving induction motor, or motors, with polar wound secondary windings, and to vary the speed of the motors, and hence of the ship, by means of an adjustable source of polyphase counter electromotive force electrically connected to the secondary windings of the motors, and preferably I obtain this counter electromotive force from a polyphase commutator machine.

The novel features of the invention which I believe to be patentable are definitely indicated in the claims appended hereto. The invention itself, together with the arrangement of apparatus, in and the mode of operation of a system of propulsion embodying the same, will be best understood from the following description taken in connection with the accompanying drawing, in which:

The figure diagrammatically illustrates an electric system of ship propulsion embodying my present invention.

Referring to the accompanying drawing, I have illustrated an elastic fluid turbine 5. The turbine is coupled through mechanical speed reducing gearing 6 to an alternating current generator 7. The mechanical gearing 6 may be of any suitable form, such, for example, as the helical gearing employed in marine equipments. The generator 7 is of the synchronous alternator type having a revolving field. The field winding of the alternator is, accordingly, connected to slip rings 8 and is adapted to be excited from suitable direct current mains 9. A polyphase induction motor 10 has its rotor mounted on the shaft of a propeller 11. A main switch 12 is included in the electrical connections between the alternator 7 and the stator winding of the induction motor 10, and a reversing switch 13 is shown for reversing the direction of rotation of the motor.

The induction motor 10 has a polar-wound secondary winding which is connected to suitable slip rings 14, in the well understood manner. A speed regulating set comprising a polyphase commutator machine 15, an exciter 16 therefor, and an induction generator 17, having their rotors mounted on a common shaft 18, are operatively connected to the slip rings 14. The speed of the induction motor is determined by the counter electromotive force of the polyphase commutator machine 15, in a manner well understood by those skilled in the art. The counter electromotive force of the polyphase commutator machine 15 is itself controlled by the excitation provided therefor by the exciter 16, and this excitation is varied by adjustment of the variable resistance 19. Adjustment of the resistance 19 thus operates to vary the speed of the induction motor 10. The polyphase commutator machine 15 operates in effect as a motor supplied with alternating current from the secondary winding of the induction motor. The motor action of the commutator machine 15 is therefore employed to drive an induction generator 17. The induction generator may be electrically connected to the main conductors between the synchronous alternator 7 and the propeller-driving induction motor 10, as shown in the drawing, and when so connected operates to pump back electric energy into the main system, as well understood in the art.

For the purpose of further explaining my present invention and emphasizing its advantageous features, I will mention a concrete case of a ship requiring 32,000 k. w. for the main drive. In accordance with my present invention, I provide two 16,000 k. w., 3,000 R. P. M., steam turbines. These turbines are mechanically geared to polyphase alternators designed to run at a speed of 480 R. P. M., the speed reduction thus being 6.25 to 1. The alternators are bi-polar, and will thus generate alternating current of a frequency of 8 cycles when driven at 480 R. M. P. The propellers are driven by four eight-pole, 10,000 H. P. induction motors with a speed of about 120 R. P. M. at the maximum speed of the ship. These motors have a power factor of about 0.94. This is in striking contrast with the power factors of the relatively high periodicity motors heretofore employed for electric ship propulsion, since the power factors of such motors have been about 0.80 to 0.85. With this improved power factor, the alternator can be of much cheaper construction, since the field of an alternator for high power factor requires less excitation than for the same output at lower power factor, and it is to be noted that the field structure is the most crowded part of the machine. The improved power factor also results in a decreased field loss, and there will also result a decrease of about ten per cent. in the armature current of the alternator for a given k. w. and voltage.

Low speed induction motors for operation from circuits at the usual commercial periodicities (60 and 25 cycles) have very low power factors and require larger, more expensive and less efficient generator plants for supplying the electricity which they consume than would be the case with motors of high power factor. The power factor is worse the higher the periodicity, and consequently conditions are much more unsatisfactory at 60 cycles than at 25 cycles, but even at this latter relatively low periodicity, the power factors of low speed induction motors are very unsatisfactory. In accordance with my present invention, much lower periodicities are available, for example eight to ten cycles per second, and the propeller-driving motors for exceedingly low speed may without difficulty be built to have a power factor of 0.94, as hereinbefore mentioned.

The speed of the propeller-driving motor, or motors, of my present system is controlled by the counter electromotive force of the polyphase commutator machine connected to the secondary winding of the induction motor. By suitable adjustments of the counter electromotive force of the polyphase commutator machine the speed of the propeller-driving induction motor can be brought to any desired value. The principal condition to success in the use of this system of speed control consists in providing from the slip rings of the induction motor electricity of very low periodicity, otherwise good commutation in the polyphase commutator machine is not attainable. The periodicity of the alternating current supplied to the brushes of the polyphase commutator machine is greater the greater the reduction effected in the speed of the induction motor, in other words, it is proportional to the slip of the induction motor. Thus, if the periodicity of the source from which the induction motor is supplied, is for example, 30 cycles, and it is desired to operate the induction motor at any speed from full speed down to two-thirds speed, then the periodicity of the electricity supplied to the brushes of the polyphase commutator motor will be zero for full speed of the induction motor and $(1-\frac{2}{3})\times 30=10$ cycles per second for two-thirds speed. A reduction of speed to only,—say—$\frac{1}{4}$ of full speed would, in such a case, be impracticable in motors of large capacity, since it would involve operating the polyphase commutator machine with the relatively high periodicity of $(1-\frac{1}{4})\times 30=22.5$ cycles per second. It may in general be said that it is rarely practicable to provide for more than 30 per cent. speed regulation on 60 cycle systems, or more than 50 per cent. speed regulation on 25 cycle systems, since it is difficult to design a large polyphase commutator machine for good commutation for higher periodicities than correspond to these conditions; indeed it is desirable to keep as far below these limits as practicable. But by employing a source of supply of so low a periodicity as ten cycles per second, speed control down to " dead slow " may be satisfactorily provided by the means employed in the system of my present invention.

In the interests of low first cost and low steam consumption per k. w. of output, the highest practicable speed should be adopted for the steam turbines employed in the system as prime movers. Thus, it is desirable for a 16,000 k. w. steam turbine to run at a speed of at least 2,500 R. P. M., and in the equipment I have heretofore mentioned, the steam turbines operate at 3,000 R. P. M. The lowest periodicity which could be obtained with the generator directly coupled to a turbine operating at 2,500 R. P. M. would be 41.6 cycles per second, assuming the generator to be bi-polar. In accordance with my present invention, however, a periodicity of not over ten cycles per second is obtained by coupling the generator to the high speed turbine through suitable speed reducing gearing. In this connection, I wish to again emphasize an important feature of the combination of apparatus which I have herein described, namely, the feature of interpolating the mechanical gearing between two relatively high speed machines. In the concrete example which I have hereinbefore given, the high speed gear member revolves at 3,000 revolutions per minute and the low speed gear member revolves at the still relatively high speed of 480 R. P. M. Mechanical speed reduction gearing is relatively very cheap and compact when used for transformation from one very high speed to another rather high speed. Mechanical gearing to effect the same ratio of reduction, viz., 6.25 to 1, between two relatively low speeds would be much more expensive and would occupy much more space. The point is that quite aside from the advantages of employing alternating current of low periodicity which I have hereinbefore described, it is better, exclusively from the standpoint of the cost and properties of mechanical gearing, that the gearing should be interposed between the prime mover and the electric generator, instead of being interposed between the motor and the propeller.

Thus, one of the important features of my present system resides in providing a large total speed reduction between the steam turbine and the propeller, the reduction from the highest speed to some intermediate speed being effected by mechanical gearing and the reduction from the intermediate speed to the propeller speed being effected by electrical gearing. As compared with a system having an all mechanical gearing my improved system has the advantage that it avoids that part of the range of speed reduction for which mechanical gearing is expensive and large; it also avoids the need for astern turbines. It further provides a wide range of speed of the propeller with constant speed of the prime mover; and also provides for operating any propeller from any prime mover, and for shutting down one or more of the prime movers when the ship is running at low speeds. As compared with a system having an all electric drive, my improved arrangement of apparatus has the advantage of providing for much better power factors in virtue of the low periodicity employed with the induction motors, and of providing for a wide range of speed control of the induction motor by the employment of auxiliary polyphase commutating machinery which is only satisfactory when supplied with electricity of exceedingly low periodicities. The low periodicity motor has only very few poles and is consequently much cheaper, more efficient, and more compact than a high periodicity motor for the same low speed. The steam turbine can be built for the highest speed consistent with low first cost and low steam consumption, and without the disadvantage that this involves relatively high periodicity, even with a bi-polar generator. The generator is of an intermediate speed, of a value corresponding to fully as low cost and to better electrical properties than correspond to a design for the very high speed required if the generator were direct-connected to the turbine.

I have herein shown and particularly described a specific embodiment of my invention for the purpose of explaining its principle and showing its applications, but numerous modifications therein and other embodiments of the invention will present themselves to those skilled in the art. I, therefore, aim to cover by the following claims all modifications and embodiments within the spirit and scope of the invention.

What I claim as new and desire to secure by Letters Patent of the United States is:

1. An electric system of ship propulsion comprising a high speed elastic fluid turbine, a relatively high speed polyphase alternating current generator, mechanical speed reducing gearing operatively connecting said turbine to said generator, the speed reduction between said turbine and said generator being such that the frequency of the generated alternating current is not greater than ten cycles per second, a propeller shaft, and a relatively low speed polyphase induction motor mounted on said shaft and adapted to be electrically connected to said generator.

2. An electric system of ship propulsion comprising a high speed elastic fluid turbine, an alternating current generator, speed reducing means operatively connecting said turbine to said generator, the speed reduction between said turbine and said generator being such that the frequency of the generated alternating current is not greater than ten cycles per second, a propeller shaft, an induction motor mounted on said shaft and adapted to be electrically connected to said generator, said induction motor having a polar wound secondary winding, and an adjustable source of polyphase counter electromotive force electrically connected to the secondary winding of said induction motor for controlling the speed of the motor.

3. An electric system of ship propulsion comprising a high speed elastic fluid turbine operating at a substantially constant speed, a bi-polar polyphase alternating current generator, mechanical speed reducing gearing operatively connecting said turbine to said generator whereby the generator is driven at a sufficiently low speed to generate alternating current of a frequency not greater than ten cycles per second, a propeller shaft, a relatively low speed induction motor mounted on said shaft and adapted to be electrically connected to said generator, said induction motor having a polar wound secondary winding, a propeller mounted on said shaft, a polyphase commutator machine electrically connected to the secondary winding of said induction motor, and means for adjusting the counter electromotive force of said polyphase commutator machine for controlling the speed of said induction motor through a wide range.

In witness whereof, I have hereunto set my hand this 20th day of September, 1916.

HENRY M. HOBART.